(12) United States Patent
Hanson

(10) Patent No.: US 8,066,080 B1
(45) Date of Patent: Nov. 29, 2011

(54) SHOVEL DEVICE

(76) Inventor: Hans Keith William Hanson, Bellingham, WA (US)

( * ) Notice: Subject to any disclaimer, the term of this patent is extended or adjusted under 35 U.S.C. 154(b) by 333 days.

(21) Appl. No.: 11/741,671

(22) Filed: Apr. 27, 2007

(51) Int. Cl.
*A01D 15/00* (2006.01)

(52) U.S. Cl. .......................... 172/13; 172/377

(58) Field of Classification Search ............ 172/13, 172/14, 15, 16, 19, 371, 376, 377, 381
See application file for complete search history.

(56) References Cited

U.S. PATENT DOCUMENTS

| | | | | |
|---|---|---|---|---|
| 607,273 A * | 7/1898 | Purdy | ............................. | 172/375 |
| 813,539 A * | 2/1906 | Vincent | ............................. | 172/13 |
| 884,416 A * | 4/1908 | Poindexter | ............................. | 172/13 |
| 902,141 A * | 10/1908 | Finch | ............................. | 172/13 |
| 903,085 A * | 11/1908 | Heather | ............................. | 172/13 |
| 913,790 A | 3/1909 | Weber | | |
| 944,859 A * | 12/1909 | Harris | ............................. | 172/19 |
| 1,020,230 A * | 3/1912 | Urban | ............................. | 172/19 |
| 1,082,570 A | 12/1913 | Underwood | | |
| 1,101,713 A * | 6/1914 | Putnam | ............................. | 172/13 |
| 1,232,255 A * | 7/1917 | Evans | ............................. | 172/13 |
| 1,263,779 A | 4/1918 | Lentz | | |
| 1,329,176 A | 1/1920 | Haugen | | |
| 1,506,410 A * | 8/1924 | Courtney | ............................. | 172/13 |
| 1,544,359 A * | 6/1925 | Tolbert | ............................. | 172/13 |
| 1,546,463 A | 7/1925 | Ayres | | |
| 1,552,517 A | 9/1925 | Study | | |
| 1,622,998 A * | 3/1927 | Foster | ............................. | 172/13 |
| 1,690,944 A | 11/1928 | Peterson | | |
| 1,754,837 A * | 4/1930 | Scullin | ............................. | 172/13 |
| 1,823,254 A * | 9/1931 | Casse | ............................. | 172/13 |
| 1,891,066 A | 12/1932 | Smith | | |
| 2,041,179 A * | 5/1936 | Higbee | ............................. | 172/13 |
| 2,743,658 A * | 5/1956 | Wynstra | ............................. | 172/13 |
| 2,787,057 A * | 4/1957 | Bell | ............................. | 30/294 |
| 2,822,740 A * | 2/1958 | Wasinger | ............................. | 172/13 |
| 3,065,801 A | 11/1962 | Wood | | |
| 5,350,021 A * | 9/1994 | Walker | ............................. | 172/13 |
| 5,502,857 A * | 4/1996 | Jubinville | ............................. | 15/111 |
| 5,826,929 A * | 10/1998 | Tisbo et al. | ............................. | 294/54.5 |
| 5,833,009 A | 11/1998 | Rebot | | |
| 6,446,733 B2 | 9/2002 | Johnson | | |

* cited by examiner

*Primary Examiner* — Robert Pezzuto
*Assistant Examiner* — Jamie L McGowan
(74) *Attorney, Agent, or Firm* — Dwayne E. Rogge; Hughes Law Firm, PLLC

(57) ABSTRACT

A shovel device having a base region and a transverse blade, the transverse blade having a longitudinally positioned forward blade edge that is operatively configured to cut the earth and trim a portion thereof. The shovel device is adapted to create an edge portion and further has a rearward wall so as to more easily allow the repositioning of removed earth from the edge region.

14 Claims, 4 Drawing Sheets

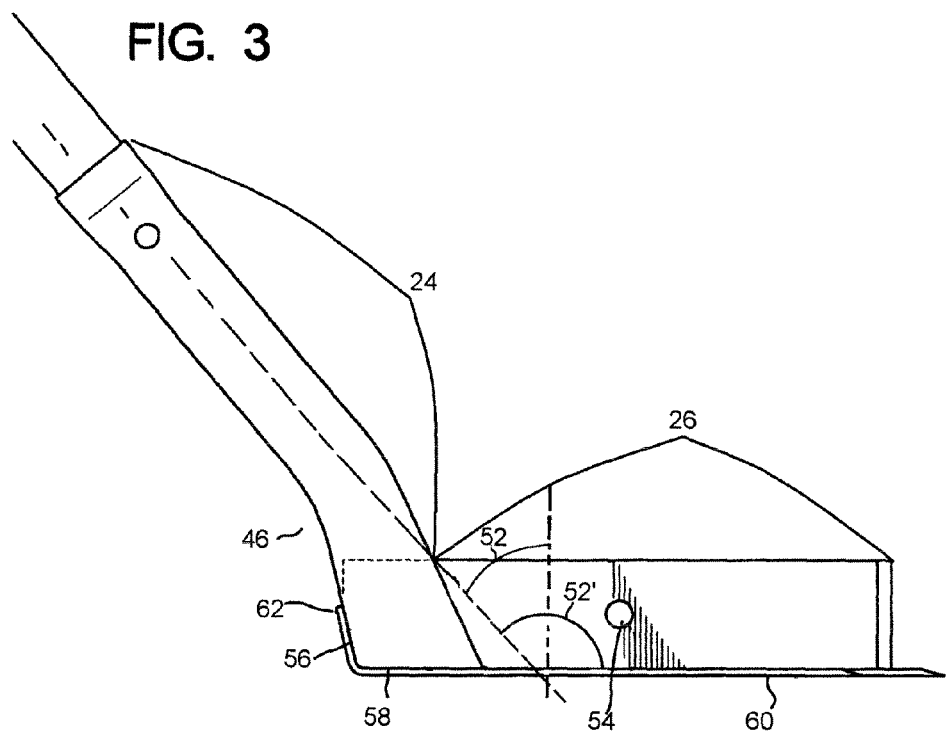
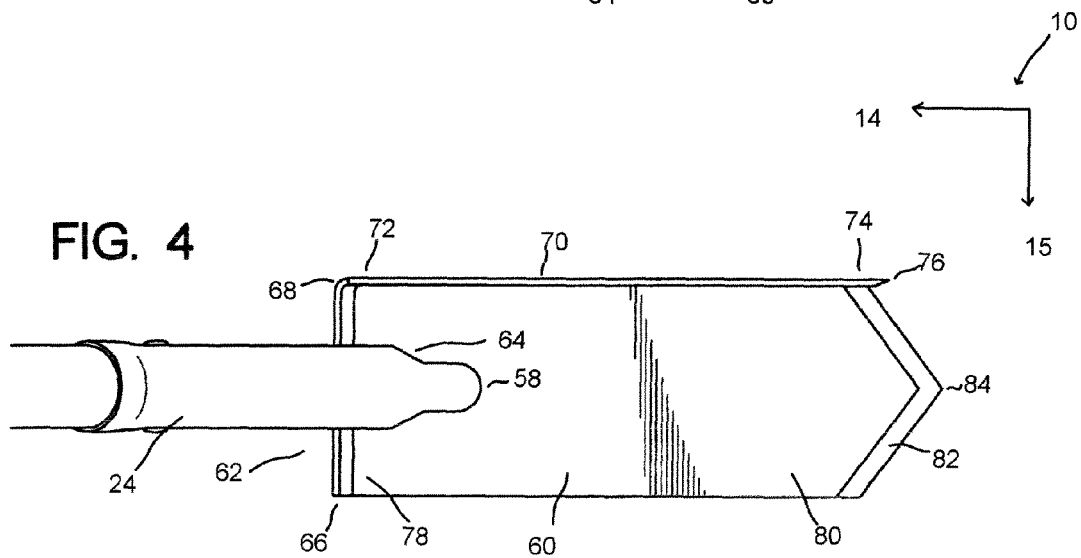

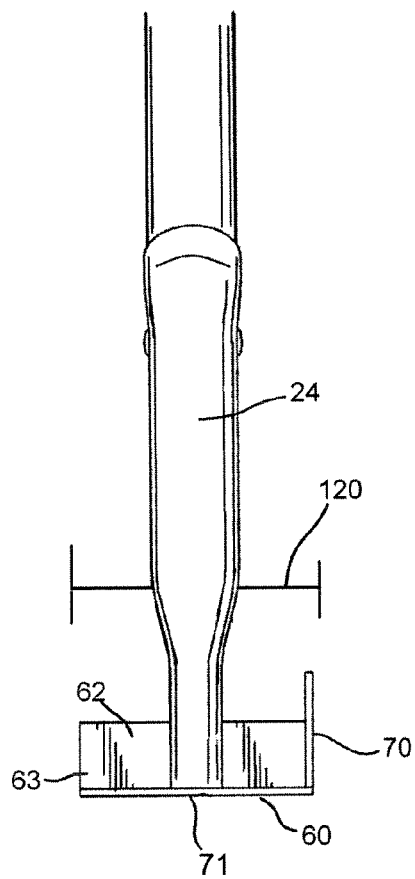
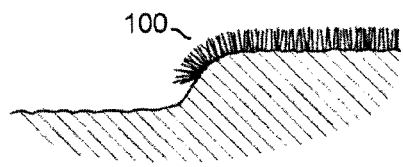
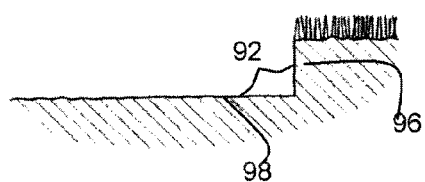
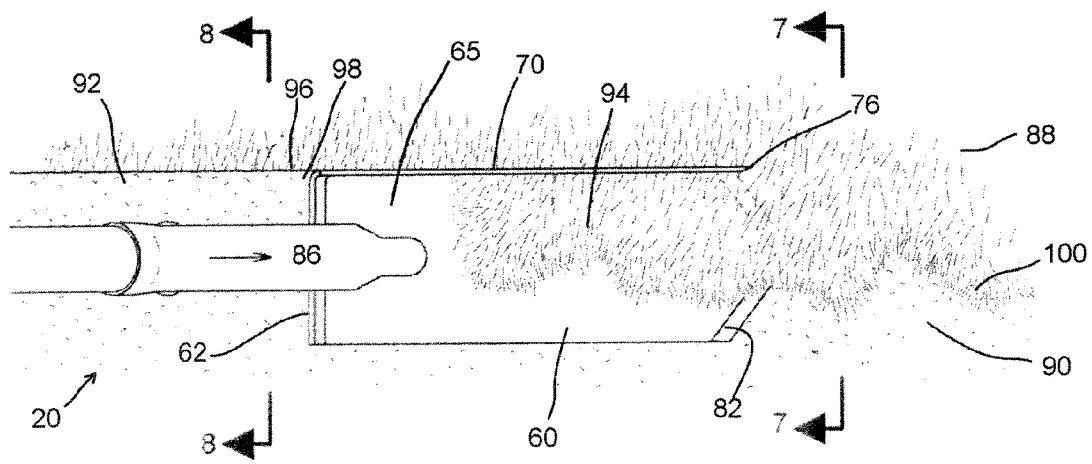

SHOVEL DEVICE

BACKGROUND

The disclosure relates to shovels and edging devices for molding the edge between walking surfaces, and landscaped surfaces such as lawns, graveled areas, beauty bark, and other similar areas. Shovels have been in use for much of recorded history, demonstrated by patents such as U.S. Pat. No. 1,690,944 which discloses a shovel-like mechanism with a very broad flat main blade having a front cutting edge, a handle and a side blade. This patent includes a side blade of less width than the main blade. Furthermore, piece connecting the handle to the flat blade is very narrow.

U.S. Pat. No. 3,065,801 discloses and claims a sidewalk edger for cutting a shallow groove and vertical trench in the turf along the edge of a sidewalk. U.S. Pat. No. 1,891,066 claims a lawn trimmer handheld device configured to require that the user's body be near the ground, with a handle that is relatively short in comparison to the height of an individual. While the patent discloses very broadly a lawn trimmer including a flat blade handle and a grass-trimming side member, the patent relates to a blade and arm being cut from a single blank sheet folded into the correct orientation. Furthermore, the material being trimmed is delivered rearwardly through the trough-like guide, and a second step must be taken to remove the trimmings from the edge of the lawn. Furthermore, the cutting edge of the '066 patent includes the cutting heel protruding perpendicular below or beneath the lowermost portion of the guide to assure severance of flattened grass.

The U.S. Pat. No. 5,833,009 includes a horizontal plate, a forward cutting edge, a second plate vertically perpendicular to the horizontal plate, and a fourth plate adjacent to the rear of the edger. This patent also includes an extension of the vertical member below the horizontal member and the rear plate being angled to directly cut material away from the vertical member. For example, on a raised edge being cut adjacent to concrete, the cut material would be projected onto the concrete, such as a sidewalk. Furthermore, the '009 patent discloses a third plate lying lateral to the horizontal plate being disposed of at an oblique angle to said vertical plate, the lateral plate having a lower edge connected to and having a forward cutting edge and a rearward edge. The intermediate plate is oriented at an oblique angle relative to the lateral plate. This relationship of plates creates a trench alongside the shovel as it is being used. U.S. Pat. No. 913,790 is designed to cut a channel of a consistent width and depth, and involves scraping a horizontal area adjacent to a walkway or path. Furthermore, the '790 patent shows a three-sided cutter formed of sheet metal.

The U.S. Pat. No. 1,082,570 is designed to cut a groove or trench in the sod and trim the edge of a lawn. Furthermore, the '570 patent discloses a single piece of steel being dented and formed to a plurality of digging surfaces attached to an extended handle. The U.S. Pat. No. 1,329,176 teaches a flat shovel blade and a handle, with one side of the flat shovel blade being bent upwardly. This patent includes a concave notch portion of the side cutting edge of the lawn edge patent.

The U.S. Pat. No. 1,546,463 discloses a lawn trimmer including a side wall, a bottom cutting portion and a handle. This patent teaches a projection to be used as a knife in some instances, the parts of the patent being created from a bent sheet of sheet metal, in addition to an incline wing on the patent and corresponding flange. The patent is configured to create a trench adjacent to a walkway.

Finally, U.S. Pat. No. 1,552,517 is very similar to the previous reference; however, it includes the addition of a tray for receiving material cut with a tool to the end of the device. Furthermore, the patent includes a shoe or bent portion configured to ride along a surface adjacent to the lawn to be trimmed and a blade configured to create a trench between the sod and the sidewalk, roadway, or surface to be trimmed.

SUMMARY OF THE DISCLOSURE

This disclosure relates to a shovel device having a base region with a first longitudinal end, a second longitudinal end, a first transverse side and a second transverse side. Also included is a handle region attached to the operating region, a back plate connected to the base region at the first longitudinal end of the base region, a transverse blade at the second longitudinal end of the base region, and a vertical sidewall having a first side connected to the first transverse side of the base region and a second side adjacent to the first side connected to the back plate. In this embodiment, the vertical sidewall has a third side opposite the second side forming a vertical blade operatively configured to cut landscape material.

In another embodiment of the disclosure, the vertical angle between the handle portion and vertical axis is between 35 and 45°. In one preferred form this vertical angle of the handle portion is 40°. In another form, there is a second vertical sidewall connected to the second transverse side of the base region.

In yet another form of the disclosure, the transverse blade forms a point near the transverse median of the transverse blade. The base region can be substantially planar in cross section. The base region may also be conceived to have a slight V-shape cross section in the transverse direction, or even a slight concave cross section in the transverse direction.

BRIEF DESCRIPTION OF THE DRAWINGS

FIG. 3 is a close-up view of the support and scooped portions of the apparatus;

FIG. 4 is a top view of the support and scooped portions;

FIG. 5 is a front view of the support and scooped portions;

FIG. 6 is an environmental view of the apparatus in use;

FIG. 7 is a cross-section view of a grassy region and walking surface prior to use of the apparatus;

FIG. 8 is a cross-section view of a grassy region and walking surface after use of the apparatus;

DESCRIPTION OF THE PREFERRED EMBODIMENTS

Before going into a more detailed discussion, an axis system 10 is utilized to help describe the drawings herein, with the axis indicated at 12 indicating a vertical axis and the arrow pointing in an upward direction. The axis indicated at 14 indicates a horizontal direction and an arrow pointing in an outward direction. The axis indicated at 14 indicates a longitudinal direction. As shown in FIG. 4 the axis at 15 indicates a transverse direction. Of course, the axes described hereunder are for general reference purposes and locate directions for ease of description and general orientation of components described herein.

Figure 2:
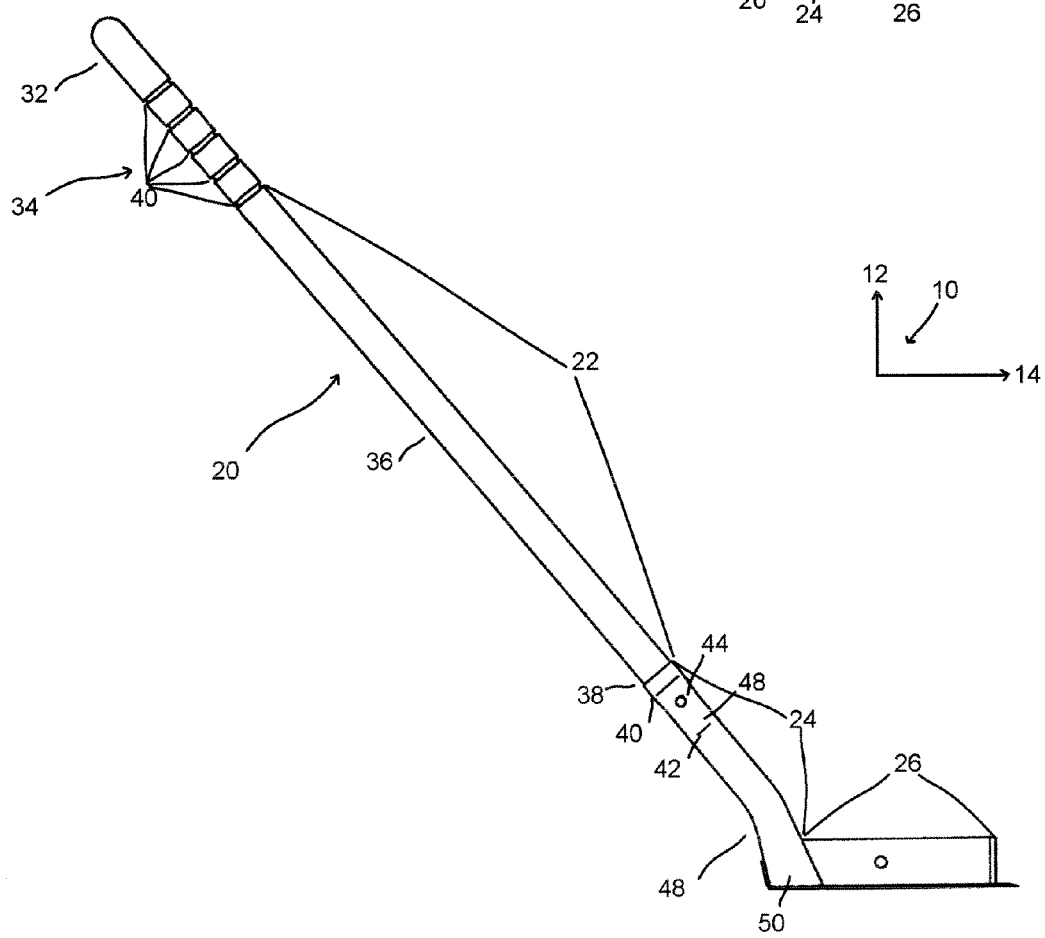
FIG. 2 is a side view of the apparatus 20.

In general, the apparatus comprises three portions shown in FIG. 2, the first being a handle portion 22, the second being a support portion 24 connected to the handle portion 22, and the third portion being a scoop portion 26 connected to the support portion 24.

The handle portion 22 is further comprised of four separate portions, the first portion being a first end 32, the second portion being an interface portion 34, the third portion being a central portion 36, and the fourth portion being a second end 38. It should be noted that the interface portion 34 can be configured to reduce or to increase the frictional coefficient between the user's hands and the surface of the interface portion 34. In FIG. 2, a plurality of annular rings 40 are utilized to increase friction between the user's hands and the surface of the interface portion 34. The central portion 36 simply connects the interface portion 34 with the second end 38 of the handle portion 22. The second end 38 of the handle portion 22 can be configured to fit within a surface defining a void 40 of the support portion 24. This hollow portion could extend to a terminus 42. A pin 44 could be utilized to further affix the handle portion 22 within a surface defining a void 40 of the support portion 24. This pin 44 can also be accomplished by a rivet, screw, nut and bolt, or any other affixing means. It is also conceivable that the surface defining a void 40 could extend the complete length of the support portion 24. Furthermore, the support portion 24 has a first end 48 generally configured to couple to the handle portion 22 and a second end 50 generally configured to couple to the scoop portion 26.

Figure 1:
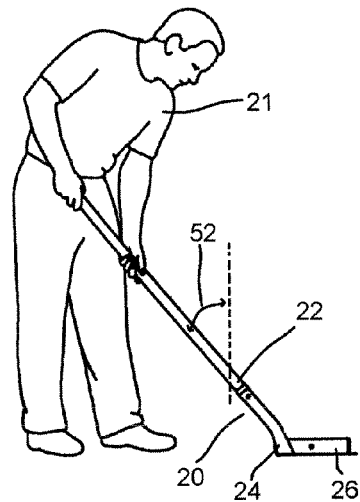
FIG. 1 is an environmental view of the apparatus in operation.

As shown in FIG. 3 the angle 52' between the handle portion 22 and the scoop portion 26 could be approximately 130° (40° from vertical as indicated by the angle 52 as shown in FIGS. 1 and 3). Present analysis indicates that a 120° to 160° angle provides a better ergonomic feel for the user of the apparatus 20. Referring back to FIG. 1, it can be seen how a relatively long handle portion 22 and an approximate 130° angle 52' between the scoop portion 26 and the handle portion 22 results in the user 21 not needing to bend over excessively to utilize the apparatus 20.

As shown in FIG. 3 there is a surface defining a void 54 which can be useful for storing the apparatus 20 such as by placing the device on a hook or nail. It is conceived that a simple nail driven to a support could be used upon passing through the surface defining a void 54 to hang the tool in an inverted position in a storage location. While it is conceived that the support portion 24 and the scoop portion 26 are comprised of a unitary structure, it is also conceived that the support portion 24 may be a separate structure directly connected to the scoop portion 26. As shown in FIG. 3, the first connective region 56 and the second connective region 58 are coupled to the base region 60. In the event the back plate 62 is not of a unitary structure with the base region 60, the first connective region 56 can be connected to the back plate 62. These two elements can be connected by way of nuts, bolts, screws, rivets welded together, or by any other fastening system.

Now referring to FIG. 4, it can be seen that the support portion 24 couples with the scoop portion 26 and further comprises a taper 64, thus reducing the transverse cross-section of the support portion 24 at the second connective region 58.

The scoop portion 26 as seen in FIG. 4 includes a plurality of structures. Beginning with the base region 60 which is a longitudinal and transverse plate at the first end of the base region 60, there is a back plate 62, this back plate being vertical and transverse to the base region 60, the back plate 62 having a first end 66 and a second end 68. The back plate in one form is substantially vertical where sod being forced into the chamber region of the shovel remains in this area to be immediately repositioned to a second location.

Figure 10:
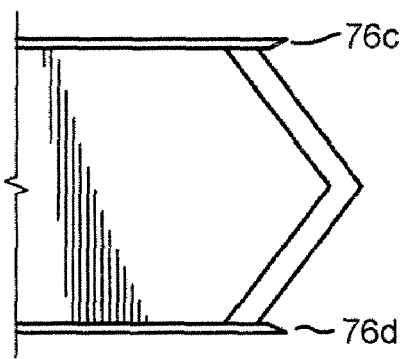
FIG. 10 is a top view of the scoop portion of the apparatus having a plurality of vertical blades.
Figure 11:
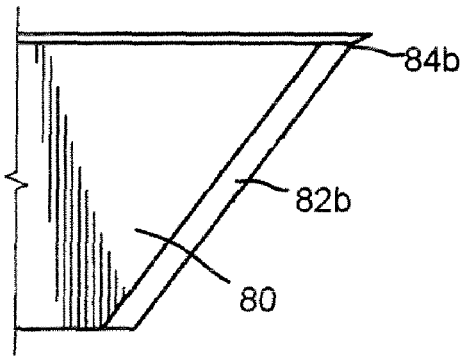
FIG. 11 is a top view of the scoop portion of the apparatus having a singular transverse blade.

The second end of the back plate 68 is connected to a vertical sidewall 70. This vertical sidewall extends vertically and longitudinal to the base region 60. The vertical sidewall couples at a first end 72 to the second end 68 of the back plate 62. The vertical sidewall 70 has a second end 74 at a longitudinal opposite end from the back plate's 62, and the vertical sidewall second end 74 terminates in a vertical blade 76. This vertical blade 76 and its functions will be described at a later point. The base region 60 has a first end 78 already discussed and connected to the back plate 62; furthermore, the base region 60 has a second end 80 terminating in a transverse blade 82. The transverse blade 82 may have several configurations as shown in FIGS. 10 and 11; the version shown in FIG. 4 terminates in a point 84 near the transverse medial point of the base region 60. Referring to FIG. 11, the transverse blade 82b has a point 84b at the transverse edge of the base region second end 80.

Now referring to FIG. 6, the apparatus 20 is being used in an operating direction 86 wherein the base region 60 is resting on a horizontal walking surface 90 adjacent to a grassy region 88. Upon forcing the apparatus 20 in the operation direction 86, the transverse blade 82 and the vertical blade 76 engage the grassy region 88 and cut the grass and possibly the grass roots as well separating them from the walking surface 90. The tool is configured such that the vertical sidewall 70 and the back plate 62 contain the cut portion 94 and enable removal of this cut portion 94 to another location, such as a wheelbarrow or a pile. Upon utilizing the apparatus 20 as mentioned, a molded region 92 is created having a pleasing vertical surface 96 and a horizontal surface 98 which generally defines an average plane on the land. This molded region 92 has a much more pleasing look to it than the uncut grassy region. The grass edge 100, previous to utilizing the apparatus 20, has a very nonlinear structure as shown in FIGS. 6 and 7. Upon using the apparatus 20, the vertical surface 96 and horizontal surface 98 of the molded region 92 have a much more linear cross-section and vertical view as shown in FIGS. 6 and 8.

Figure 9:
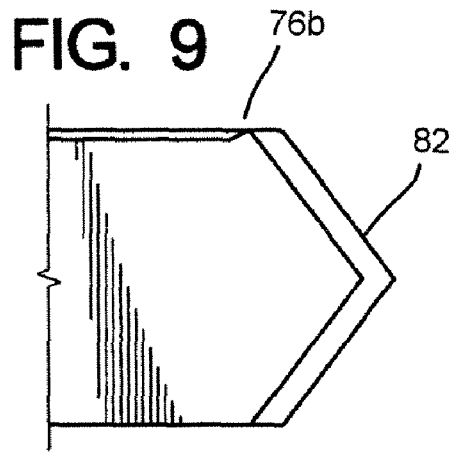
FIG. 9 is a top view of the scoop portion.

Now referring to FIG. 9, a new embodiment of the disclosure can be seen wherein the vertical blade 76b is set back longitudinally from the transverse blade 82. As shown in FIG. 4, a different embodiment was previously discussed wherein the vertical blade 76 extends beyond the longitudinal terminus of the transverse blade 82.

FIG. 10 shows the vertical blade 76 having a transverse counterpart 76d. This plurality of vertical blades 76c and 76d would form a trough, and in conjunction with the back plate 62 could be used to form trenches or to cut grass while using either or both blades.

FIG. 11 shows the transverse blade 82b having a different structure from the embodiment shown in FIGS. 4, 9 and 10, wherein the transverse blade 82b extends the entire width of the base region 60 before converging to a point at the transverse terminus 84b.

Figure 12:
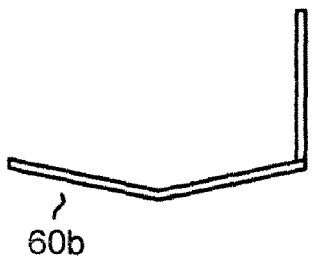
FIG. 12 is a cross-sectional front view of the scoop portion having a vertical view cross-section.
Figure 13:
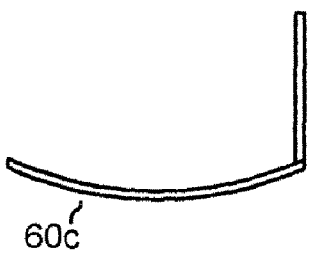
FIG. 13 is a cross-sectional front view of the scoop portion having a concave vertical cross-section.

As shown in FIG. 4, the base region 60 has a transverse and longitudinal surface being essentially flat with little or no depth in the vertical direction. FIGS. 12 and 13 however show the base region having a separate vertical cross-section, wherein as shown in FIG. 12, the base region 60b has a V-shaped structure. FIG. 13 shows the base region 60c having a vertically concave cross-section.

As shown in FIG. 5, the dimension 120 represents the proximate width of the back plate 62 where the front surface 63 is substantially orthogonal to the base member portion 60. This desirable arrangement allows for sod or earth, as shown at 94 in FIG. 6, to be held within the chamber region 65 that is roughly defined by the upper surface of the base region 60, the inner surface of the vertical wall, and the forward surface 63 of the rear plate 62.

It should be noted that the apparatus 20 can be used for a variety of other implements, such as clam digging for razor clams. The primary use is for lawn edging and trenching, electrical and irrigation systems as well as golf course maintenance. In a golf course application the tool is useful for (among other tasks) edging the perimeter region of a sand trap. The flat portion on the bottom portion is desirable for brick laying, hardscape, and other types of work. The flat edge can keep a 90° angle from the foundation and the bottom portion of the whole. Therefore, one preferred form is having a flat lower base surface 60 such as shown in FIG. 5 is substantially perpendicular to the outer surface of the vertical sidewall. For example, as shown in FIG. 5, the outer surface 71 in one form is perpendicular to the lower surface 73. In this form, the tool is ideally suited for edging along a lower perimeter of a structure or being utilized for various brickwork activities where the lower surface 73 is substantially planar and configured to level out the mater therebelow.

Further, having the central chamber region defined by the bottom side rear walls allows the user to remove the material while the excavating process is occurring. It can operate like a level and scoop at the same time. Therefore, the shovel 20 is a multipurpose shovel.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

Therefore I claim:

1. A shovel device for removing edging debris for an edge portion of a lawn, the shovel device comprising:
    a) a scoop region having a base region, a first longitudinal end, a second longitudinal end, a first transverse side and a second transverse side, the base region further having a lower surface and an opposing upper surface,
    b) a support portion coupled to the upper surface of the base region,
    c) a handle attached to the support portion,
    d) a substantially vertical back plate orthogonal to the first transverse side of the base region, the back plate connected to the base region at the first longitudinal end of the base region, a forward surface of the substantially vertical back plate also attached to the support portion,
    e) a transverse blade at the second longitudinal end of the base region,
    f) a vertical sidewall, substantially as tall in the vertical direction as the vertical back plate, having a first side connected to the first transverse side of the base region and having a second side adjacent to the first side connected to the back plate the vertical sidewall further having an outer surface,
    g) wherein the second transverse side of the base region does not comprise a sidewall,
    h) the vertical sidewall having a third side opposite the second side forming a vertical blade operatively configured to position on the edge of a lawn and removing edging debris therefrom where the second transverse side of the scoop region defines an open region for allowing portions of the lawn to extend thereout,
    i) whereas the base region, the back plate and the vertical side wall define a sod holding chamber configured to maintain a cut portion of the lawn therein after edging the portion of the lawn where the lower surface of the base region and the outer surface of the vertical sidewall arrange to meet at a corner juncture without protrusions extending from either the lower surface or the outer surface that would inhibit collecting and removing the cut portion of the lawn
    j) whereas the removed cut portion of the lawn may be removed from the base region by a transverse tilting of the shovel device as there is no sidewall on the second transverse side.

2. The shovel device of claim 1 wherein the vertical angle between the scoop region and the handle portion is between 120° and 160°.

3. The shovel device of claim 2 wherein the vertical angle between the scoop region and the handle portion is 130°.

4. The shovel device of claim 1 wherein the transverse blade forms a point near the transverse median of the transverse blade.

5. The shovel device of claim 1 wherein the base region is substantially planar in cross section.

6. The shovel device of claim 1 wherein the base region has a slight V-shape cross section in the transverse direction.

7. The shovel device of claim 1 wherein the base region has a slight concave cross section in the transverse direction.

8. The shovel device of claim 1 wherein the vertical sidewall comprises a surface defining a void placed substantially in the middle of the vertical sidewall, the surface defining a void to be used to store the shovel device in an inverted position.

9. The shovel device of claim 1 wherein the support portion comprises a taper that reduces the transverse cross-section of the support portion where it is coupled to the base region.

10. A method for edging a portion of land comprising:
    a) retrieving a shovel device having a base region with an upper surface and having first and second longitudinal ends and first and second transverse sides, the shovel device having a handle member coupled with the base region at a first longitudinal end and a vertical side wall at the first transverse side of the base region, the vertical sidewall having a vertical blade and having an inner surface and a longitudinal forward blade portion and substantially orthogonal to the base region, the vertical sidewall having a surface defining a void placed substantially in the middle of the vertical sidewall, the surface defining a void to be used to store the shovel device in an inverted position,
    b) orientating the base region so it is substantially in a plane with the average plane of the land where the base region does not provide any downward protrusions from a lower surface upon the base region which would obstruct orientating the base region with the average plane of the land, c) arranging the vertical blade so a forward portion of the blade removes a portion of the land to create a landscaping edge where an outer surface of the vertical blade is substantially planar, d) having the handle be positioned at least 120° or greater with respect to a horizontal plane for a proper ergonomic handling of the shovel device, and the handle is tapered to reduce the transverse cross-section of the handle where it is coupled to the base region, e) positioning earth on the upper surface of the base region and the inner surface of the vertical sidewall, f) the shovel device further having a back wall having a forward surface which extends substantially the length of the width of the base region where the back wall maintains the cut earth on the base region and the cut earth is repositioned to a second location where the shovel device is removed from the landscaping edge to reposition the cut earth and the cut earth can extend laterally in a direction opposite the vertical blade without any vertical obstruction in the second transverse side of the base region.

11. The method as recited in claim 10 where the base region is substantially planar.

12. The method as recited in claim 10 where the base region has a center longitudinal axis where the upper surface of the base region slopes downwardly to the center longitudinal axis.

13. The method as recited in claim 10 where the longitudinal forward blade portion incises the earth to create a substantially vertical wall portion adjacent to the edge of a grass lawn.

14. The method as recited in claim 10 where the handle has a plurality of annular rings to assist in the grasping thereof.

* * * * *